United States Patent [19]

Sutton

[11] 4,344,534
[45] Aug. 17, 1982

[54] PIZZA CARRIER

[76] Inventor: Bernard Sutton, Bldg. No. 10, Glenn Hollis Cir., Decatur, Ga. 30034

[21] Appl. No.: 211,466

[22] Filed: Nov. 28, 1980

[51] Int. Cl.³ .............................................. B65D 11/10
[52] U.S. Cl. .................................. 206/545; 220/94 R
[58] Field of Search ........ 206/545; 220/3.1, DIG. 10, 220/94 R, 323, 324, 326; 229/52 A

[56] References Cited
U.S. PATENT DOCUMENTS 3,927,812 12/1975 Winters et al. ................... 220/94 R
4,058,214 11/1977 Mancuso ............................. 206/545
4,190,155 2/1980 Higley ................................. 206/545

Primary Examiner—Steven M. Pollard
Attorney, Agent, or Firm—Charles E. Baxley

[57] ABSTRACT

A pizza carrier constructed for maintaining pizza and other foods hot until ready for consumption. The carrier is provided with a tray having an insulated bottom and insulated cover for the tray. The carrier has an interior chamber spaced from the outer walls of the cover and insulating material there between. Easily operated hinges are employed to open the carrier. Locking means for the carrier's tray and cover and a carrier handle for the carrier are provided.

3 Claims, 7 Drawing Figures

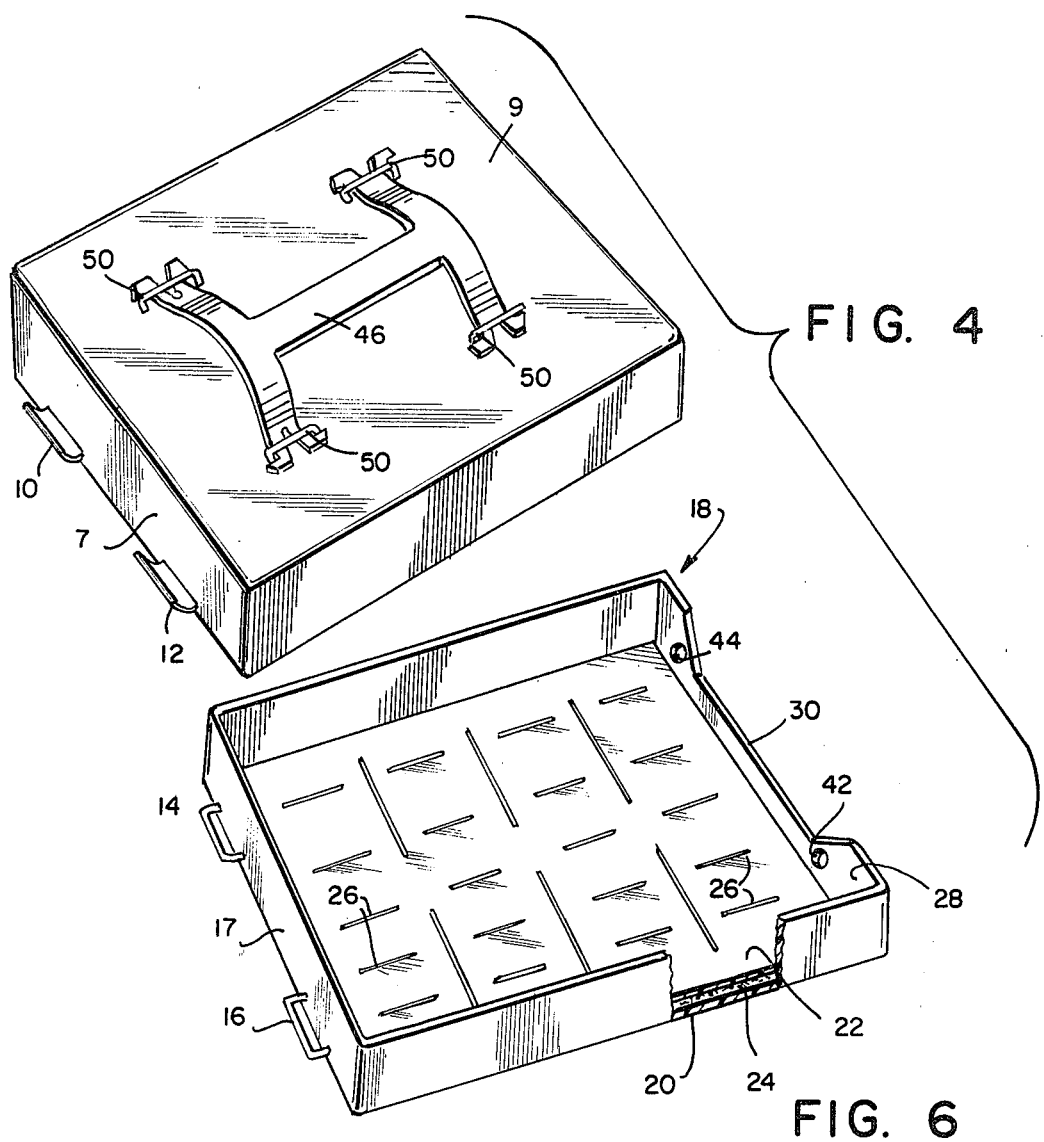
FIG. 4
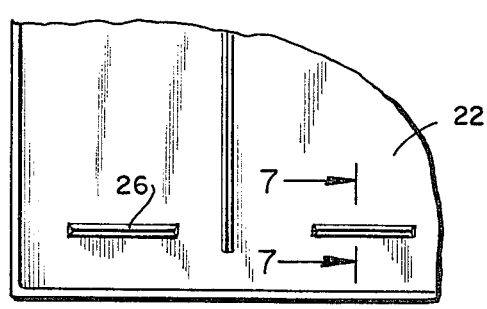
FIG. 5
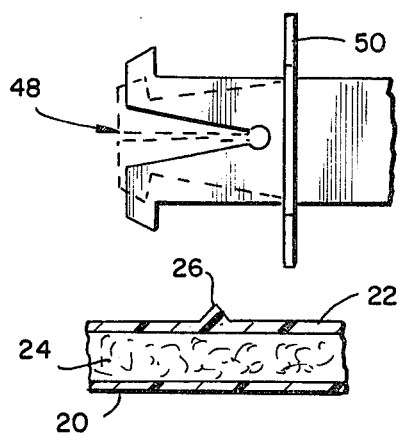
FIG. 6
FIG. 7

PIZZA CARRIER

The invention relates to hot food carriers in general and in particular to a hot food carrier for pizza and other so-called "take out" foods which it is desirable to maintain hot until they are consumed. A carrier of this kind must be capable of maintaining food at substantially its preparation temperature for as long as possible and must protect the food from damage while it is being carried.

Accordingly it is the object of the invention to provide a food carrier which will maintain the heat of pizza or other hot foods for a substantial period of time until these are ready to be consumed.

Another object of the invention is to provide a carrier of such character which is provided with insulating means for maintaining the heat within the carrier.

A further object of the invention is provide a food carrier which sturdy, light weight and simple in construction, efficient in operation and economical to manufacture.

The foregoing objects will become apparent from the following description and accompanying drawing.

In the drawing:

FIG. 4 is a perspective view of the carrier tray and cover showing details of construction.

FIG. 5 shows a detail of construction of the bottom of the tray.

FIG. 6 illustrates a detail of the carrier handle and

FIG. 7 is a cross-section taken on line 7—7 of FIG. 5.

Figure 1:
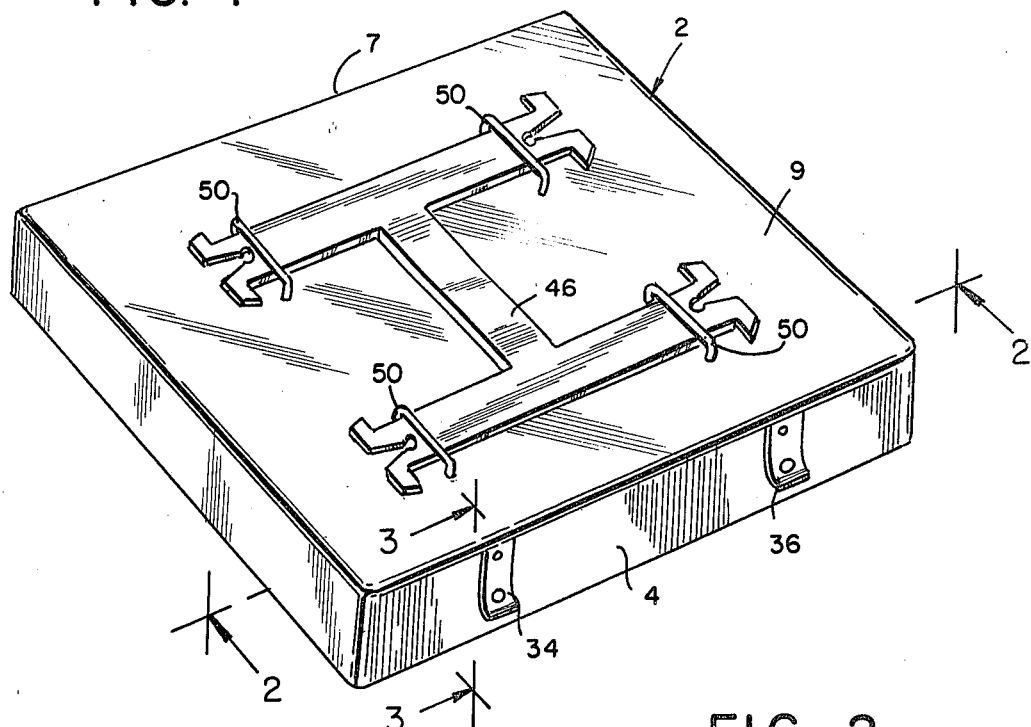
FIG. 1 is a perspective view of the pizza carrier.
Figure 2:
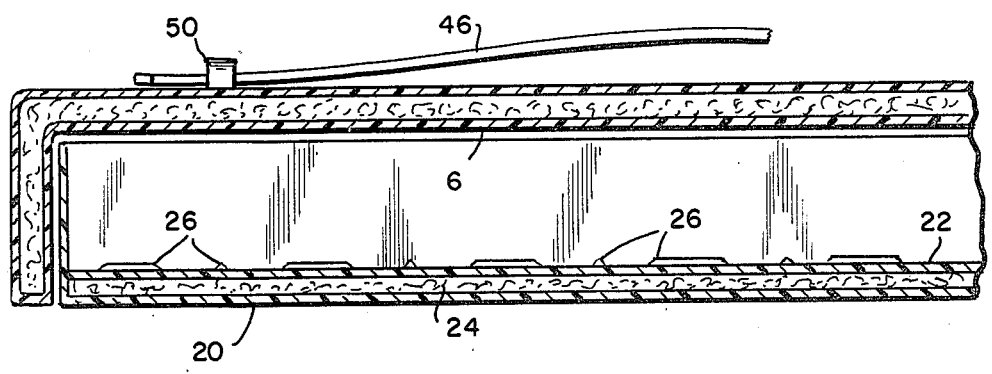
FIG. 2 is a cross-section taken on line 2—2 of FIG. 1.
Figure 3:
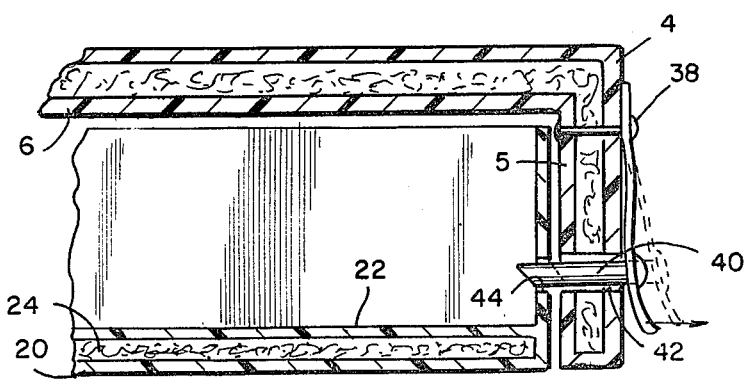
FIG. 3 is a cross-section taken on line 3-x of FIG. 1.

Referring now to the drawing in detail, the pizza carrier shown in FIG. 1 comprises a tray cover having an outer front wall 4, a rear wall 5 a top wall and side walls. The tray cover is formed with inner walls forming an enclosed chamber filled with heat insulating material. The rear wall of the cover is provided with a pair of hooks 10, 12 which are engageable with cleats 14, 16 on rear wall 17 of tray 18 which receives a pizza or similar 4 or another heated food desired to be kept warm. The tray 18 is formed with an outer bottom wall 20 and an inner bottom wall 22. A layer of heat insulating material known in the art to interposed between the two bottom walls. The bottom wall 22 is formed with upwardly extending spacers 26 which serve to support a pizza or other food article carrier in carrier 2. The front wall 28 of the tray has a cut out portion 3 for conveniently grasping the pizza when removing it from the tray. As shown in FIG. 3, there are provided a pair of batches for securing removably the tray cover 2 to the tray 18.

The latches consist of leaf springs 34, 36 secured to outer front wall 4 of the cover and an inner wall 5 by a rivet 38. Secured to each free end of leaf springs 34, 36 is a pin 40 which is adapted to enter holes 40, 42 under the bias of leaf springs 34, 36 respectively.

A carrying handle 46 is provided for the pizza carrier. The carrying handle consists of an "H"-shaped piece of flexible plastic material. The free ends of the handle can be readily inserted in or removed from brackets 50 by contracting the ends to the position illustrated by dotted lines in FIG. 6.

I claim:

1. An insulated hot food carrier for hot pizza and other hot foods in a hot or warm state; comprising a tray having a front wall and a rear wall and side walls, an outer bottom wall and an inner bottom wall spaced from the outer bottom wall, a heat insulating substance interposed between said outer and inner bottom walls, a cover provided with insulating means for enclosing said tray, means for detachably securing said cover in intimate engagement with said tray and means for carrying said carrier detachably secured to said cover, said cover insulating means comprises a chamber formed by inner walls spaced from said outer walls and heat insulating materials in said chamber, said means for detachably securing said cover to said tray consists of a pair of leaf springs secured to one said tray consists of a pair of leaf springs secured to one side of said cover with one end, a pin secured to the free end of each of said leaf springs said pin normally extending through aligned holes in an outer side wall, adjacent inner walls of said chamber and said tray, said means for securing said cover to said tray further including a pair of hooks secured to the rear wall of said cover and engageable with extending from the rear wall of said tray.

2. The hot food carrier as claimed in claim 1, wherein said inner bottom wall of said tray is formed with upwardly extending spacers for supporting pizza or other hot foods spacedly from said inner bottom walls.

3. The hot food carrier as claimed in claim 2, wherein said carrying means for said carrier consists of an "H" shaped piece of flexible material having "V"-shaped free ends formed with hook-line extensions, said "V" ends being contractible for inserting in or removing from brackets integral with the top of said cover.

* * * * *